Aug. 21, 1962  W. M. REESE  3,050,085
DIFFERENTIAL PRESSURE RESPONSIVE DEVICE
Filed March 24, 1958  3 Sheets-Sheet 1

INVENTOR
WILLIAM MAURICE REESE,
BY *[signature]*
ATTORNEYS

Aug. 21, 1962 W. M. REESE 3,050,085
DIFFERENTIAL PRESSURE RESPONSIVE DEVICE
Filed March 24, 1958 3 Sheets-Sheet 2

INVENTOR
WILLIAM MAURICE REESE,

BY
ATTORNEYS

INVENTOR
WILLIAM MAURICE REESE,

BY

ATTORNEYS

United States Patent Office 3,050,085
Patented Aug. 21, 1962

3,050,085
DIFFERENTIAL PRESSURE RESPONSIVE DEVICE
William Maurice Reese, % Industrial Instrument Corp.,
P.O. Box 777, Austin, Tex.
Filed Mar. 24, 1958, Ser. No. 723,429
13 Claims. (Cl. 137—779)

This application is a continuation-in-part of my prior application, filed June 28, 1956, Serial No. 594,440, now Patent No. 2,827,716.

This invention relates to improvements in differential pressure responsive devices of the character used for measuring pressures in different environments such, for instance, as the drop in pressure through an orifice plate in a flow line or between separate chambers, and for other purposes.

It has been proposed heretofore to construct a differential pressure responsive device of the character described, which uses two opposed bellows mounted on a center plate and adapted for open communication with each other through a passageway controlled by suitable valves. The pressures to be measured are applied, respectively, to the exteriors of the two bellows, and the bellows move in response thereto, and one of these bellows controls the pressure responsive element such, for instance, as a meter, indicator, recorder or controller, etc.

The bellows normally are filled with an incompressible liquid which, nevertheless, is subject to expansion by variations in temperature. When the device is used in conditions where there may be a substantial fluctuation of temperature, the expansion or contraction of the liquid confined within the bellows may cause an erroneous action of the responsive instrument. However, some of the expansion or contraction is taken up by the free bellows, but under extreme conditions, a variation in the transmission of force may be produced in accordance with a substantial variation in temperature.

One object of this invention is to improve the construction of the differential pressure responsive device by compensating for variations in temperature and pressure that may be encountered, as affected by the expansion or contraction of the liquid in the instrument, which otherwise may produce an erroneous action of the responsive element and deleteriously affect the sealing members utilized.

Another object of the invention is to provide for expansion or contraction of the bellows by the action of temperature variations on the liquid enclosed therein to effect uniform indications or recordings without regard to variations in temperature.

A further object of the invention is to provide bimetallic means forming a part of one of the bellows and subjected to heat exchange relation with the liquid therein to cause an expansion or contraction of the volume of the bellows in response to variations in temperature acting on the liquid thereby to effect and maintain uniform operation of the responsive element regardless of variations in temperature.

A still further object of this invention is to provide a pressure compensated sealing arrangement to equalize the fluid pressures acting upon the sealing member.

These objects may be accomplished, according to one embodiment of the invention, by providing a pair of bellows, one of which is free while the other is connected with a responsive device, such as a recorder or indicator. The bellows are filled with a liquid that flows back and forth therebetween in response to variations in pressure acting on the bellows. A bimetallic member forms the end wall of the free bellows and causes expansion or contraction of said free bellows in response to such variations in temperature, without affecting the action of the liquid on the responsive device, thereby to maintain the accuracy of the instrument. Moreover, this provides for the setting of the instrument at absolute zero.

The bellows are provided with appropriate O-ring seals to prevent the escape of the liquid contained therein. By modifying the conventional sealing arrangement in a manner hereinafter described the pressures acting upon opposite sides of the O-rings are equalized thereby reducing the stress on the O-rings and insuring a leakproof joint.

This embodiment of the invention is illustrated in the accompanying drawings, in which:

FIG. 3 is a cross section through the center plate element on the line 4—4 in FIG. 5.

While the invention is adapted for many uses as a differential pressure responsive device, for measuring, controlling or indicating pressure differentials, one embodiment of the invention is illustrated as a differential flow meter to measure the drop in pressure through an orifice plate in a flow line. A typical gas or liquid flow line is provided with an orifice plate therein. Connected with the flow line on opposite sides of the orifice plate are pipes 3 and 4, respectively, which extend to the differential pressure responsive device constituting this invention, being connected, respectively, with the high and low pressure chambers thereof.

Figure 1:
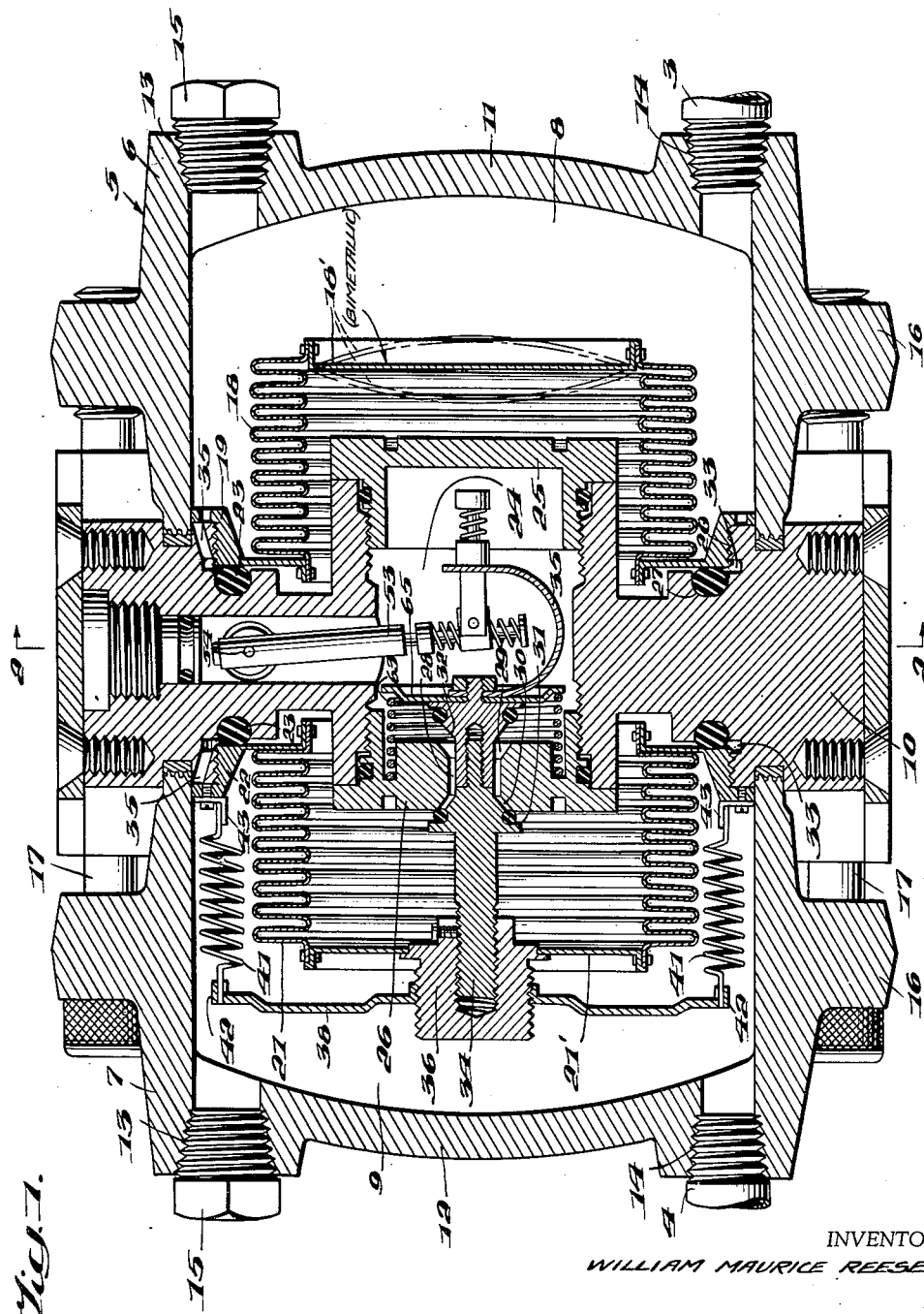
FIG. 1 is a longitudinal section through a differential pressure responsive device embodying this invention.
Figure 2:
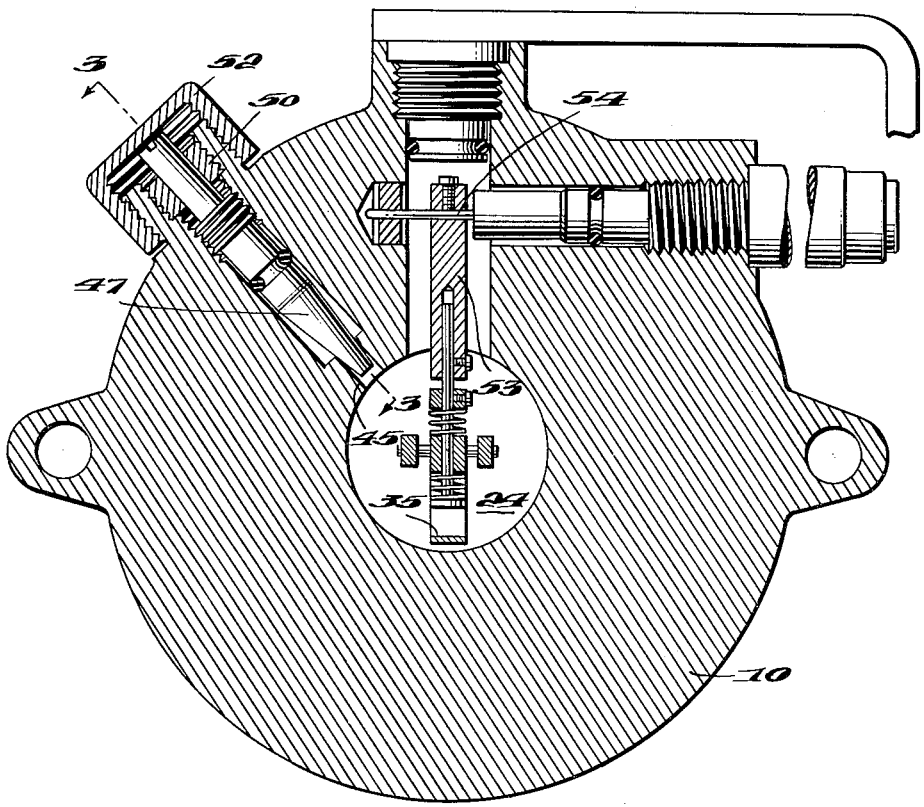
FIG. 2 is a detailed cross section therethrough, substantially on the line 2—2 in FIG. 1.

The embodiment of this device which is illustrated in the drawings comprises a housing generally indicated at 5, the construction of which is shown in FIG. 1. The housing 5 includes a high pressure cylinder or body 6 and a corresponding low pressure cylinder or body 7 arranged in axial alignment with each other and enclosing, respectively, high and low pressure chambers 8 and 9. The chambers 8 and 9 are separated from each other by a center plate 10.

The housing cylinder or body 6 is closed at its outer end by a head 11, while the cylinder or body 7 is likewise closed at its outer end by a head 12. The heads 11 and 12 are shown as formed in one integral piece with the cylinders or bodies 6 and 7, respectively, although they may be separate therefrom if desired and secured rigidly thereto. Each of the heads 11 and 12 is provided with tapped connector openings 13 and 14 of the same or of different diameters as, for instance, one-quarter inch and one-half inch, respectively. One set of the openings is connected with the pipes 3 and 4, while the other set is closed by plugs 15. Either set of tapped connector openings may be used according to the size of pipes to be connected therewith.

Each of the cylinders or bodies 6 and 7 is provided with radially disposed flanges or lugs 16 for connecting together the cylinders or bodies 6 and 7 through cap screws or tie bolts 17. Several such tie bolts may be used as required.

Mounted within the high pressure chamber 8 is a bellows 18 closed at its outer end by a bimetallic plate 18' and exposed externally to the pressure within the high pressure chamber 8. The inner end of the bellows 18 is sealed to a nut 19 screw-threaded into a counter-sunk portion in the adjacent lateral face of the center plate 10. A sealing ring is shown at 23, preferably an O-ring, which effects a complete sealing from the inside of the bellows 18 around the periphery of the nut 19 into the chamber 8.

A portion 20 of the center plate 10 is threaded to receive the nut 19 and has an annular trough 27 to receive the sealing ring 23. A circumferential slot 33 is counter-sunk in the side wall of the portion 20 immediately adjacent the annular trough 27. An angular passageway 35 connects the slot 33 with the high pressure chamber 8 so that the fluid in chamber 8 is free to circulate through slot 33.

When the nut 19 is screwed into position on top of the sealing ring 23, the sealing ring has its inner portion exposed to the liquid in the bellows 18 and its outer portion exposed to the fluid in the chamber 8. Since the pressures in the chamber and bellows remain equal, this means that the seal is subjected to much less stress than in the case of unequal pressures and is consequently more effective.

Mounted in the low pressure chamber 9 is a bellows 21 closed at its outer end by a plate 21', the periphery of which bellows is exposed to the pressure in the chamber 9. The inner end of the bellows 21 is sealed to a nut 22 screw-threaded into a recessed portion of the center plate 10 and provided with a peripheral seal at 23, corresponding with the connection at 19–23 described above. The groove of the peripheral seal 23 in the nut 22 is also counter-sunk at 33 and vented at 35 to the chamber 9 for equalization of pressures. The peripheries of the nuts 19 and 22 are sufficiently loose in the chambers for leakage of fluid pressure thereby.

The bellows 18 and 21 preferably have substantially equal effective areas and are both exposed externally to the liquid or gas within the chambers 8 and 9. The construction herein set forth provides for the use of larger bellows requiring several times the sealing fluid contained therein, which gives greater displacement with increased drive power. This provides several times the total calibrated travel as compared with other bellows heretofore used in instruments of this general type. The bellows 18 and 21 are filled with a suitable liquid that is adapted to flow back and forth in response to variations in pressure in the chambers 8 and 9.

The center plate 10 is provided with an axial passageway therethrough, formed with a cored out chamber 24. The axial passageway is closed by plugs 25 and 26 at opposite ends thereof, preferably screw-threaded into opposite sides of center plate 10 and sealed thereto. This plug 25 forms a cap over the chamber 24 at the adjacent side of the center plate 10 and closes the chamber 24 against direct open communication with the interior of the high pressure bellows 18.

The plug 26 has a passageway 28 therethrough provided with high and low pressure valve seats 29 and 30, respectively, at opposite ends of said passageway, adapted to be engaged alternatively by valves 31 and 32 respectively, on a valve stem 34. The valves 31 and 32 are fixed to each other with their opposed faces spaced apart a distance greater than the distance between the valve seats 29 and 30 so that only one of these valves will engage its seat at a time and both valves may be open at the same time, as illustrated in FIG. 1. O-ring seals may be provided in the faces of the valves 31 and 32 for sealing the valves against the seats 29 and 30, respectively, or any other sealing means desirable may be used for this purpose.

The valve stem 34 is carried by a plug 36 secured rigidly to a plate 38. At its inner end, the plug 36 is sealed to the end plate 21' of the bellows 21 and abuts in seated relation therewith.

The plate 38 normally is urged in an inward direction by range springs 41 spaced at intervals around the periphery of the low pressure bellows 21. Each of the range springs 41 is secured at one end to a peripheral ring connection 42 on the plate 38 and at its opposite end to a similar ring connection 43 secured to the adjacent lateral face of the nut 22 so as to extend parallel with the axis of the bellows 21 and normally tending to contract the latter and to move the valve 31 toward a closed or seated position.

The center plate 10 is provided with a by-pass passage (see FIG. 3) from the chamber 24 therein into the high pressure bellows 18. This by-pass passage is formed by a radial passage 45 in the center plate 10, open at one end to the chamber 24 and having a lateral outlet 46 into the high pressure bellows 18. These passages 45 and 46 will allow the free circulation of liquid from the chamber 24, which may be in open communication with the low pressure bellows 21, into the high pressure bellows 18.

Figure 3:
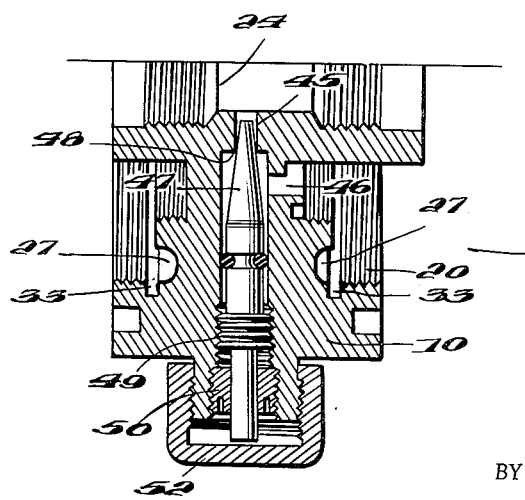
FIG. 3 is a further cross section on the line 3—3 in FIG. 2.
Figure 4:
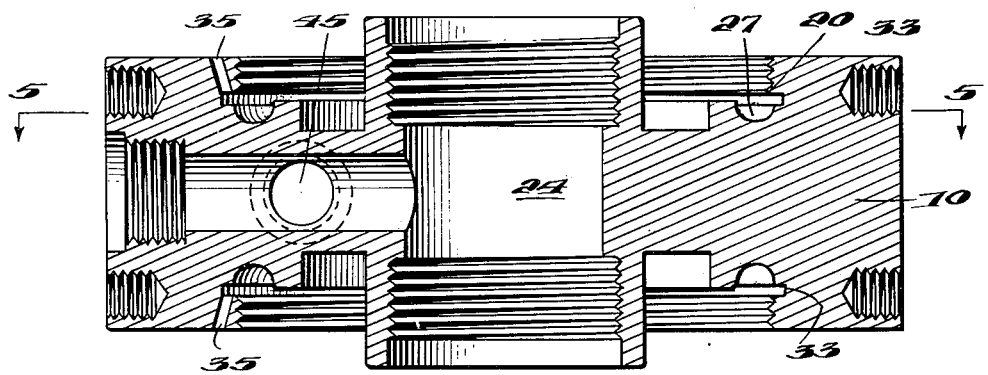
Figure 5:
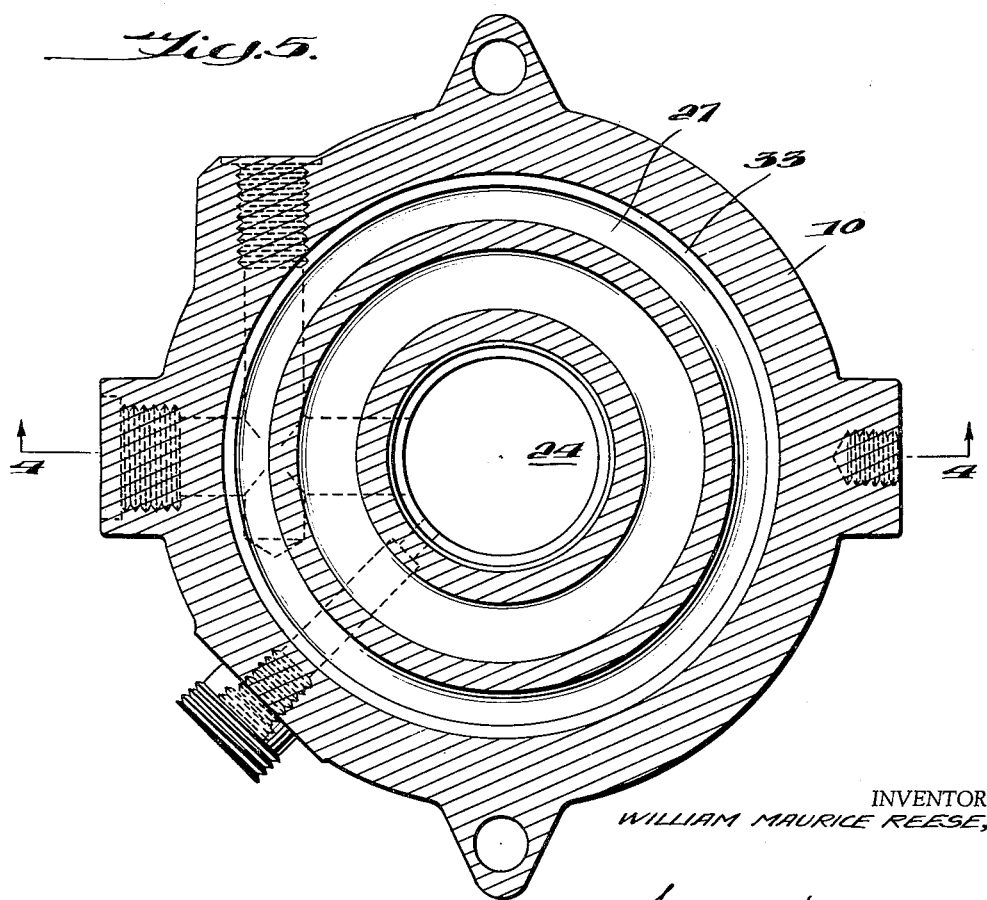
FIG. 5 is a cross section of the center plate element on the line 5—5 in FIG. 4.

This communication may be controlled by a pulsation dampener restriction valve 47 which is of the needle type, normally adjustable and adapted to engage a seat 48 intermediate the passages 45 and 46 to control the opening therebetween and communication therethrough. The valve 47 is adjustably mounted at 49 in the plate 10 and is held in place by a nut 50 screw-threaded into a projecting portion of the plate, as shown in FIG. 3. A cap 52 closes the outer end of the valve and is removable for access thereto.

This valve 47 is adapted to be seated in a predetermined position so as to permit normal flow of liquid from one bellows to the other, but to restrict excessive flow due to greatly increased pressures. The normal flow between the bellows is controlled by the valves 31 and 32, being moved in accordance with the relative pressures on the high and low pressure bellows 18 and 21.

The valve stem 34 is adapted for connection with an arm 53 which extends downwardly in the chamber 24 of the center plate 10 from a shaft 54 at its upper end. The shaft 54 extends through a non-freezing bearing of the type set forth in my prior Patent No. 2,712,968, dated July 12, 1955. The shaft may be connected with any suitable indicator, recorder or other device, which may be desirable to actuate in response to the differential of pressure connected with the chambers 8 and 9.

The bellows 18 and 21 normally are filled with an incompressible thermostatic liquid. Variations in temperature will affect the volume of the liquid and, in so far as the volume may increase or decrease, would likewise affect the position of the arm 53. While the free bellows 18 will compensate to a substantial extent for expansion of contraction of the liquid, provisions may be made for further compensation, so that any variations in temperature acting on the liquid in the bellows will not affect the absolute zero of the instrument connected therewith.

As set forth in my prior Patent No. 2,762,391, I may use, if desired, a thermostatic element 35 connected between the valve stem 34 and the arm 53. This element 35 is shown as a bimetallic bar, one end of which is connected with the valve stem and the other end has an operative connection with the arm. This bimetallic member may be in the form of a U-shaped member, loop or the like, or of other desired character.

I have also found that it is desirable to vary the action of the free bellows in response to variations in temperature by means forming a part of the free bellows in heat exchange relation with the liquid therein.

The free bellows 18 has a natural resiliency which causes a predetermined expansion thereof when the pressures on the inside and outside of said bellows are balanced evenly. The convolutions of the free bellows, in that event, would be spaced uniformly apart. Any variations in the pressures acting on the free bellows will change the spacing of the convolutions as a result of the expansion or contraction thereof under such changes in pressure.

While a certain degree of temperature compensation is provided by the free bellows 18, the natural resiliency of the bellows will introduce variations in the transmission of force under extreme conditions in accordance with a substantial variation in temperature. For this reason it is desirable to provide additional means to compensate for variations in temperature. This is accomplished by means of the bimetallic plate 18' which forms the end wall of the bellows 18.

Bimetallic plate 18' is in head exchange relation with the liquid in bellows 18 and when this liquid is subjected to high temperature the plate 18' will be bowed outwardly, as shown by the dotted lines in FIG. 1, sufficiently to compensate for the increase in volume of the liquid without affecting the position of the low pressure bellows 21. When the temperature decreases, the plate 18' is drawn inwardly, as shown by the dotted lines in FIG. 1, and thus compensates for the decrease in volume.

While the range springs 41 may be used alone and control the action of the valves 31 and 32 and the flow of liquid between the bellows 18 and 21, these range springs may not be required and may be omitted in other instances, especially where there is a low differential to be measured by the device. In that event, a tension spring 63 may be used, surrounding the projecting end of the valve stem 34 and interposed between the plug 26 and a plate 65 secured to the end of the valve stem. By the use of both the tension springs 41 and the coiled tension spring 63, a wide range of differentials may be accommodated, or suitable adjustments made in the spring tension applied to the valve stem as found desirable. Such tension spring is set forth and claimed in my prior application Serial No. 504,440, filed April 28, 1955.

In other respects, the construction and operation of this device is substantially the same as set forth in my prior Patents No. 2,762,391, No. 2,762,392, and No. 2,762,393, all of which were issued on September 11, 1956.

While the invention has been illustrated and described in one embodiment, it is recognized that variations and changes may be made therein without departing from the invention as set forth in the claims.

I claim:

1. In a differential pressure responsive device, a housing having pressure chambers therein, bellows having portions exposed to said pressure chambers and enclosing a liquid, means operatively connected with one of the bellows and movable thereby in response to variations in pressure acting on the bellows, and bimetallic means connected with one of the bellows for providing an end wall therewith in heat exchange relation with the liquid for varying the volume of said bellows to accommodate changes in volume of the liquid.

2. In a differential pressure responsive device, a housing having pressure chambers therein, a bellows and additional means each having a portion exposed to respective ones of said pressure chambers, said bellows and additional means enclosing a liquid, means operatively connected with the additional means and movable thereby in response to variations in pressure acting on the bellows and additional means, and bimetallic means in heat exchange relation with the liquid for providing an end wall of the bellows for varying the capacity thereof in response to variations in temperature acting on the liquid and on the bimetallic means.

3. In a differential pressure responsive device, a housing having pressure chambers therein, bellows having portions exposed to said pressure chambers and enclosing a liquid, means operatively connected with one of the bellows and movable thereby in response to variations in pressure acting on the bellows, and means separate from the bellows for establishing a liquid seal between the interior of the bellows and the pressure chambers, said means being exposed to both the pressure in said pressure chambers and the liquid in the interiors of said bellows, whereby the pressures acting on said means are substantially equalized.

4. In a differential pressure responsive device, a housing having pressure chambers therein, bellows having portions exposed to said pressure chambers and enclosing a liquid, means operatively connected with one of the bellows and movable thereby in response to variations in pressure acting on the bellows, thermostatic means connected with one of the bellows in heat exchange relation with the liquid for varying the volume of said bellows to accommodate changes in volume of the liquid, and means separate from the bellows establishing a liquid seal between the bellows and the pressure chambers, said means being exposed to both the pressure in said pressure chambers and the liquid in the interiors of said bellows, whereby the pressures acting on said means are substantially equalized.

5. In a differential pressure responsive device, a housing having pressure chambers therein, a bellows and additional means each having a portion exposed to respective ones of said pressure chambers, said bellows and additional means enclosing a liquid, means operatively connected with the additional means and movable thereby in response to variations in pressure acting on the bellows and additional means, thermostatic means in heat exchange relation with the liquid and forming an end wall of the bellows for varying the capacity thereof in response to variations in temperature acting on the liquid and on the thermostatic means, and means separate from the bellows for establishing a liquid seal between the bellows and the pressure chambers, said means being exposed to both the pressure in said pressure chambers and the liquid in the interiors of said bellows, whereby the pressures acting on said means are substantially equalized.

6. In a differential pressure responsive device, a housing having pressure chambers therein on opposite sides of a center plate, bellows connected to the center plate and having portions exposed to said pressure chambers and enclosing a liquid, means operatively connected with one of the bellows and movable thereby in response to variations in pressure acting on the bellows, and bimetallic means forming an end part of one of the bellows opposite the center plate and in heat exchange relation with the liquid for varying the volume of said bellows to accommodate changes in volume of the liquid.

7. In a differential pressure responsive device, a housing having pressure chambers therein on opposite sides of a center plate, a bellows and additional means each having a portion exposed to respective ones of said pressure chambers, said bellows and additional means enclosing a liquid, means operatively connected with the additional means and movable thereby in response to variations in pressure acting on the bellows and additional means, and bimetallic means in heat exchange relation with the liquid and forming an end wall of the bellows opposite the center plate for varying the capacity thereof in response to variations in temperature acting on the liquid and on the bimetallic means.

8. In a differential pressure responsive device, a housing having pressure chambers therein, bellows having portions exposed to said pressure chambers and enclosing a liquid, means operatively connected with one of the bellows and movable thereby in response to variations in pressure acting on the bellows, bimetallic means connected with one of the bellows in heat exchange relation with the liquid for varying the volume of said bellows to accommodate changes in volume of the liquid, and O-ring seals between the interior of the bellows and the pressure chambers, said O-ring seals being exposed to both the pressure in said pressure chambers and the liquid in the interiors of said bellows, whereby the pressures acting on said seals are substantially equalized.

9. In a differential pressure responsive device, a housing defining a pressure chamber, an expansive bellows within said chamber having a circumferential end fixed to said housing, fluid under pressure in said chamber and in said bellows, means between the housing and the bellows for establishing a seal between said end of the bellows and the chamber, said means having opposite portions exposed to both said chamber and the interior of said bellows, whereby the fluid pressures acting on said means are substantially equalized.

10. In a fluid pressure device, a housing containing fluid under pressure, a bellows exposed externally to the fluid in said housing, said bellows enclosing a fluid, means for attaching the bellows to said housing, and sealing means between the housing and the attaching means for preventing fluid from flowing between the interior of the bellows and the interior of the housing, said sealing means being exposed to both the fluid in the housing and the interior of the bellows, whereby the pressures acting on said sealing means are substantially equalized.

11. In a fluid pressure device, a housing containing fluid, an expansive bellows exposed externally to the fluid in said housing and movable in response to changes of pressure of said fluid, said bellows enclosing a fluid, the pressures of the fluid in the housing and in the bellows remaining substantially equal, means for securing one end of the bellows to said housing, and sealing means contacting the housing and the securing means for preventing fluid from flowing between the interior of the bellows and the interior of the housing, said sealing means being exposed to both said pressures whereby said pressures balance each other to make the sealing means effective.

12. In a differential pressure responsive device, a housing defining a pressure chamber adapted to receive fluid under pressure therein, a bellows within said chamber enclosing fluid under pressure, said bellows having a closed end and the opposite end being connected with an end of the chamber, and means between the housing and the bellows establishing a fluid seal between the interior of the bellows and the pressure chamber, one side of said seal means being exposed to the pressure in the bellows, and means for exposing substantially the opposite side of the seal means to the pressure in the housing.

13. In a differential pressure responsive device, a housing defining a pressure chamber adapted to receive fluid under pressure therein, a bellows within said chamber enclosing fluid under pressure, said bellows having a closed end and a circumferential opposite end, a mounting ring extruding substantially coextensive with the last-mentioned end and connected with the housing, and means between the housing and said mounting ring establishing a fluid seal between the interior of the bellows and the pressure chamber, one side of said seal means being exposed to the pressure in the bellows, and means for exposing substantially the opposite side of the seal means to the pressure in the housing.

References Cited in the file of this patent

UNITED STATES PATENTS

| | | |
|---|---|---|
| 811,833 | Emmet | Feb. 6, 1906 |
| 2,021,156 | Smith | Nov. 19, 1935 |
| 2,281,417 | Darby | Apr. 28, 1942 |
| 2,509,143 | Getchell | May 23, 1950 |
| 2,578,730 | Nicholson et al. | Dec. 18, 1951 |
| 2,590,324 | Jones | Mar. 25, 1952 |
| 2,632,475 | Elo | Mar. 24, 1953 |
| 2,664,749 | Jones | Jan. 5, 1954 |
| 2,704,548 | Ralston | Mar. 22, 1955 |
| 2,725,078 | Glancy | Nov. 29, 1955 |
| 2,762,393 | Reese | Sept. 11, 1956 |
| 2,811,835 | Rike | Nov. 5, 1957 |
| 2,827,716 | Reese | Mar. 25, 1958 |
| 2,879,781 | Gimson | Mar. 31, 1959 |
| 2,903,500 | Newell et al. | Sept. 8, 1959 |